(12) United States Patent
Zhang et al.

(10) Patent No.: US 11,923,779 B2
(45) Date of Patent: Mar. 5, 2024

(54) CONTROL CIRCUITS AND METHODS FOR REGULATING OUTPUT VOLTAGES

(71) Applicant: Astec International Limited, Kowloon (HK)

(72) Inventors: Bing Zhang, Shenzheng (CN); Lian Liang, Shenzhen (CN); Mei Qin, Shenzhen (CN); Xiaodong Fan, Shenzhen (CN); Guozhen Wang, Shenzhen (CN)

(73) Assignee: Astec International Limited, Kowloon (HK)

( * ) Notice: Subject to any disclaimer, the term of this patent is extended or adjusted under 35 U.S.C. 154(b) by 0 days.

(21) Appl. No.: 17/054,232

(22) PCT Filed: Nov. 5, 2020

(86) PCT No.: PCT/CN2020/126649
§ 371 (c)(1),
(2) Date: Nov. 10, 2020

(87) PCT Pub. No.: WO2022/094830
PCT Pub. Date: May 12, 2022

(65) Prior Publication Data
US 2023/0261583 A1   Aug. 17, 2023

(51) Int. Cl.
*H02M 3/158*   (2006.01)
*H02M 1/00*   (2006.01)
*H02M 3/335*   (2006.01)

(52) U.S. Cl.
CPC ..... *H02M 3/33592* (2013.01); *H02M 1/0025* (2021.05); *H02M 3/158* (2013.01)

(58) Field of Classification Search
CPC ........... H02M 3/33592; H02M 1/0025; H02M 3/158; H02M 3/155–1588
See application file for complete search history.

(56) References Cited

U.S. PATENT DOCUMENTS 7,883,808 B2 * 2/2011 Norimatsu ........... H01M 8/1011
429/432
8,581,565 B2 11/2013 Tang et al.
(Continued)

FOREIGN PATENT DOCUMENTS

CN    101877922 A    11/2010
CN    103166464 A    6/2013
(Continued)

OTHER PUBLICATIONS

International Search Report and Written Opinion for PCT Application No. PCT/CN2020/126649, filed Nov. 5, 2020, dated Aug. 2, 2021; 8 pages.

*Primary Examiner* — Yusef A Ahmed

(57) ABSTRACT

A method of regulating an output voltage of a switched mode power supply having a variable input voltage and at least one power switch is provided. The method includes generating a control signal for the at least one power switch of the switched mode power supply based at least in part on a control voltage, the control signal having a duty cycle. The method also includes generating a reference voltage based at least in part on the duty cycle of the control signal and a maximum duty cycle, and generating the control voltage based at least in part on the reference voltage and the output voltage.

14 Claims, 8 Drawing Sheets

(56) References Cited

U.S. PATENT DOCUMENTS

| | | | | |
|---|---|---|---|---|
| 9,535,438 B2* | 1/2017 | Yuan | | H02M 3/156 |
| 9,698,694 B2* | 7/2017 | Xiang | | H02M 3/33592 |
| 9,979,307 B2* | 5/2018 | Kha | | H02M 3/33523 |
| 10,153,701 B2 | 12/2018 | Karlsson et al. | | |
| 10,224,828 B1* | 3/2019 | Sigamani | | H02M 3/33592 |
| 10,355,601 B2* | 7/2019 | Liu | | H02M 3/33515 |
| 10,686,370 B1* | 6/2020 | Bonnano | | H02M 3/07 |
| 11,223,289 B2* | 1/2022 | Liang | | H02M 3/33573 |
| 2004/0145923 A1* | 7/2004 | Van Bodegraven | | |
| | | | | H02M 3/33507 |
| | | | | 363/20 |
| 2006/0043952 A1* | 3/2006 | Huang | | H02M 3/158 |
| | | | | 323/282 |
| 2007/0040536 A1* | 2/2007 | Smith, Jr. | | H02M 3/1588 |
| | | | | 323/280 |
| 2007/0047268 A1* | 3/2007 | Djenguerian | | H02M 3/33515 |
| | | | | 363/21.13 |
| 2007/0290658 A1* | 12/2007 | Chen | | H02M 3/157 |
| | | | | 323/222 |
| 2009/0097284 A1* | 4/2009 | Takei | | H02M 3/33507 |
| | | | | 363/56.1 |
| 2010/0079323 A1* | 4/2010 | Miao | | H02M 3/157 |
| | | | | 341/142 |
| 2010/0123446 A1* | 5/2010 | Cheng | | H02M 3/1588 |
| | | | | 323/288 |
| 2011/0127980 A1* | 6/2011 | Chen | | H02M 3/156 |
| | | | | 323/282 |
| 2011/0241636 A1* | 10/2011 | Wu | | H02M 3/1584 |
| | | | | 323/272 |
| 2011/0316508 A1* | 12/2011 | Cheng | | H02M 1/14 |
| | | | | 327/134 |
| 2013/0279204 A1* | 10/2013 | Yang | | H02M 3/33592 |
| | | | | 363/21.01 |
| 2013/0343094 A1* | 12/2013 | Karlsson | | H02M 3/33507 |
| | | | | 363/17 |
| 2014/0159689 A1* | 6/2014 | Chen | | H02M 3/156 |
| | | | | 323/282 |
| 2014/0217999 A1* | 8/2014 | Wibben | | G05F 1/468 |
| | | | | 323/282 |
| 2015/0003116 A1* | 1/2015 | Karlsson | | H02M 3/33538 |
| | | | | 363/17 |
| 2015/0055375 A1* | 2/2015 | Karlsson | | H02M 3/33592 |
| | | | | 363/17 |
| 2015/0109825 A1* | 4/2015 | Karlsson | | H02M 3/33546 |
| | | | | 363/17 |
| 2015/0200595 A1* | 7/2015 | Xiang | | H02M 3/33592 |
| | | | | 363/15 |
| 2015/0200598 A1* | 7/2015 | Kha | | H02M 3/33523 |
| | | | | 363/17 |
| 2015/0372605 A1* | 12/2015 | Karlsson | | G05F 1/10 |
| | | | | 363/21.06 |
| 2018/0375437 A1* | 12/2018 | Liu | | H02M 3/33523 |
| 2019/0319540 A1* | 10/2019 | Arno | | H02M 1/0025 |
| 2021/0226543 A1* | 7/2021 | Liang | | H02M 3/33573 |
| 2021/0336527 A1* | 10/2021 | Chang | | H02M 1/12 |

FOREIGN PATENT DOCUMENTS

| | | |
|---|---|---|
| CN | 103683944 A | 3/2014 |
| CN | 108616209 A | 10/2018 |

* cited by examiner

CONTROL CIRCUITS AND METHODS FOR REGULATING OUTPUT VOLTAGES

TECHNICAL FIELD

Aspects of the disclosure are related to electronic components and in particular to the voltage regulation of power systems.

TECHNICAL BACKGROUND

DC to DC power converters are often used to provide a stable DC voltage in applications such as telecommunications, data communications, bus converters for servers, and the like. They are required to maintain a stable output voltage over a range of input voltages.

However, when their input voltage drops too low, they are unable to maintain their optimal output voltage, and instead provide a lower output voltage. As the input voltage varies, it is desirable that the output voltage is smooth and predictable.

OVERVIEW

In an embodiment, a method of regulating an output voltage of a switched mode power supply having a variable input voltage and at least one power switch is provided. The method includes generating a control signal for the at least one power switch of the switched mode power supply based at least in part on a control voltage, the control signal having a duty cycle.

The method also includes generating a reference voltage based at least in part on the duty cycle of the control signal and a maximum duty cycle, and generating the control voltage based at least in part on the reference voltage and the output voltage.

In another embodiment, a control circuit for regulating an output voltage of a switched mode power supply having a variable input voltage and at least one power switch is provided. The control circuit is configured to generate a control signal for the at least one power switch of the switched mode power supply based at least in part on a control value, the control signal having a duty cycle.

The control circuit is also configured to generate a reference value based at least in part on the duty cycle of the control signal and a maximum duty cycle, and to generate the control value based at least in part on a difference between the reference value and the output voltage.

In a further embodiment, a switched mode power supply comprising a power circuit and a control circuit is provided. The control circuit is configured to generate a control signal for the at least one power switch of the switched mode power supply based at least in part on a control voltage, the control signal having a duty cycle.

The control circuit is also configured to generate a reference voltage based at least in part on the duty cycle of the control signal and a maximum duty cycle, and to generate the control voltage based at least in part on a difference between the reference voltage and the output voltage.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The example embodiments described herein illustrate different methods for controlling the output voltage of a switched mode power supply.

Figure 1:
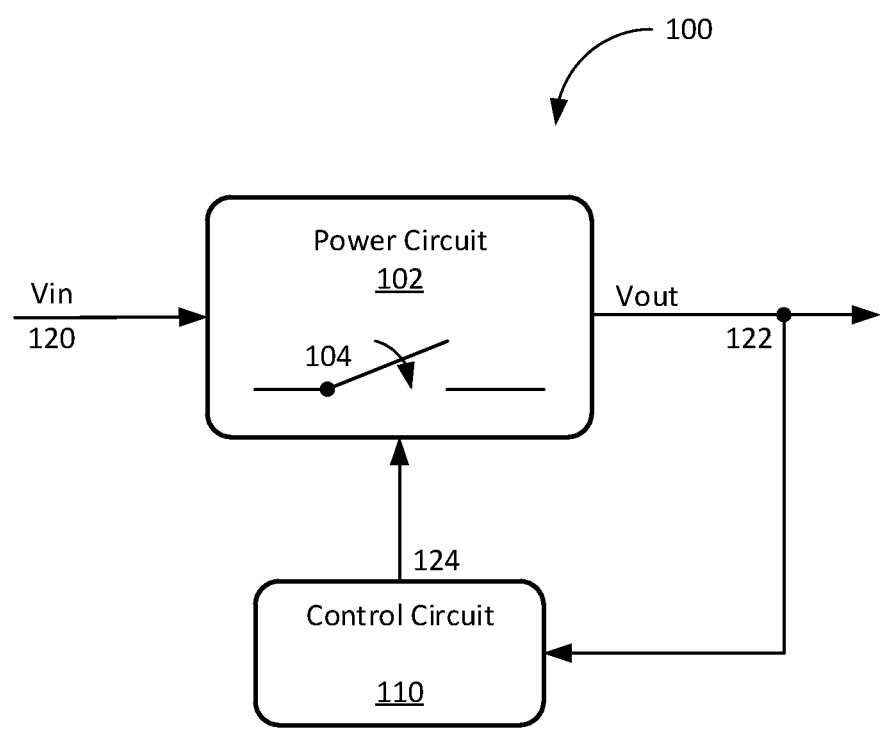
FIG. 1 illustrates a switched mode power supply comprising a power circuit and a control circuit.

FIG. 1 illustrates a switched mode power supply (SMPS) 100 comprising a power circuit 102 and a control circuit 110. As illustrated in FIG. 1, switched mode power supply 100 includes power circuit 102 having an input 120, an output 122, and at least one power switch 104 coupled between input 120 and output 122. Vin is applied to input 120, and Vout is generated at output 122. Switched mode power supply 100 also includes control circuit 110 receiving output 122 from power circuit 102, and configured to provide a control signal 124 having a duty cycle to the at least one power switch 104 within power circuit 102.

Control circuit 110 is configured to provide control signal 124 to power circuit 102 in order to regulate output voltage Vout at the output 122 of power circuit 102, regardless of any changes in input voltage Vin at the input 120 of power circuit 102. In various embodiments of the present invention control circuit 110 may be implemented as an analog circuit or a digital circuit as described in detail below, all within the scope of the present invention.

Figure 2:
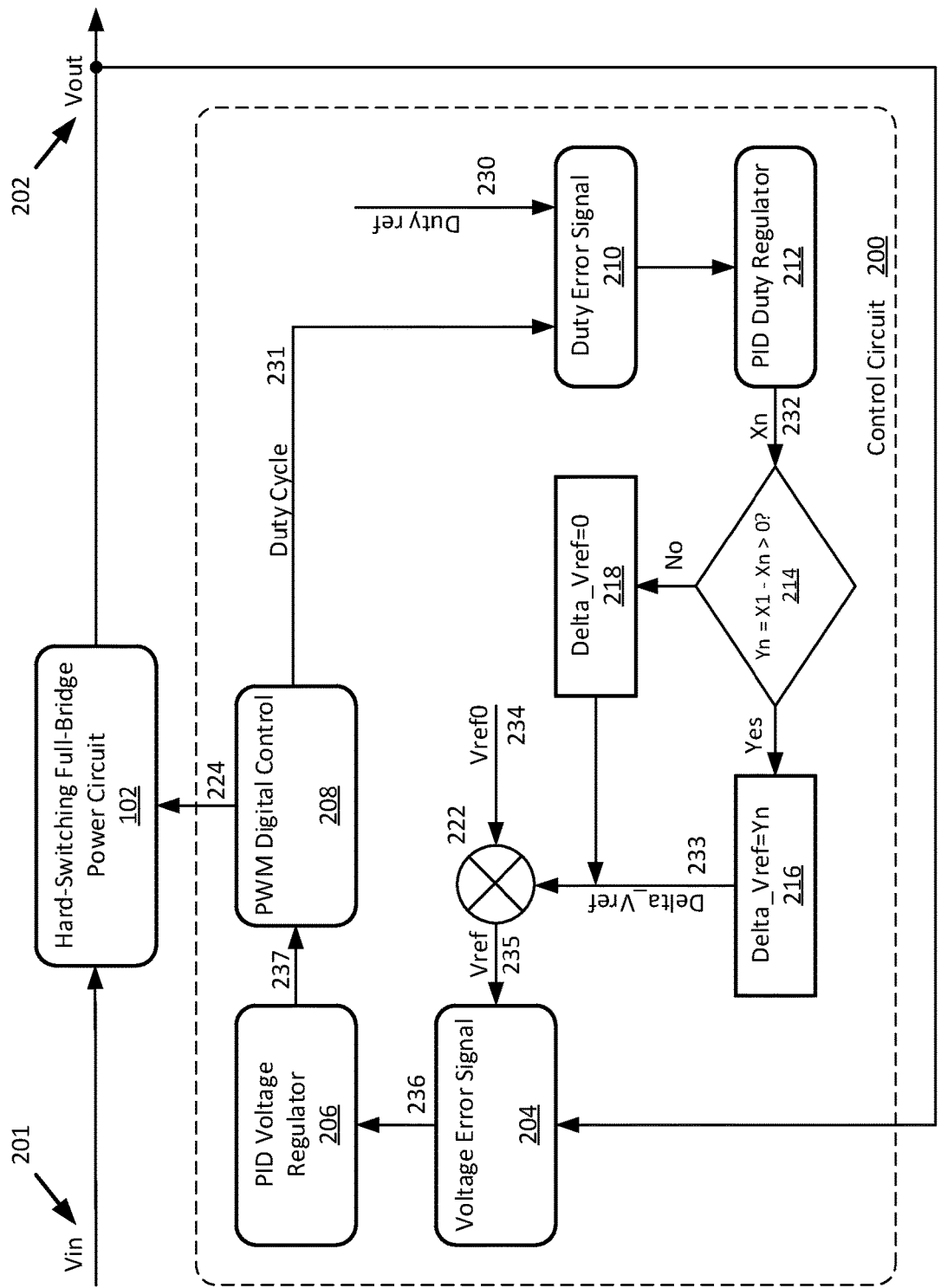
FIG. 2 illustrates an exemplary switched mode power supply comprising a power circuit and a digital control circuit.

FIG. 2 illustrates an exemplary switched mode power supply 100 comprising a power circuit 102 and a digital control circuit 200. In this example embodiment, power circuit 102 comprises a hard-switching full-bridge power circuit, however other embodiments may comprise other power circuit configurations within the scope of the present invention. The present invention may be applied in all buck serial topologies, such as buck, forward, double-forward, phase-shift full-bridge, hard-switching half-bridge, push-pull, and the like. It is suitable for any intermediate DC to DC bus converter.

As described above, with respect to FIG. 1, control circuit 200 is configured to provide control signal 224 to power circuit 102 in order to regulate output voltage Vout at the output 202 of power circuit 102, regardless of any changes in input voltage Vin at the input 201 of power circuit 102.

In this example embodiment, Duty ref 230 is the maximum duty cycle reference signal, and is a constant value set in firmware. Duty Cycle 231 is a signal corresponding to the current duty cycle of power circuit 102 which is set by control signal 224.

Duty cycle error signal module 210 compares Duty ref 230 to Duty Cycle 231 and provides a difference between the two values to proportional-integral-derivative (PID) duty cycle regulator module 212. PID duty cycle regulator module 212 processes this difference between Duty ref 230 and Duty Cycle 231 and outputs signal Xn 232. Variable Yn is set to X1-Xn 232, where X1 is a constant value set in firmware and less than the maximum value of Xn. In a decision operation 214, Yn is compared to zero. If Yn is greater than zero, operation 216 sets signal Delta_Vref 233 to the value of variable Yn. If Yn is less than or equal to zero, operation 218 sets signal Delta_Vref 233 to zero.

Signal Vref0 234 is a maximum output voltage reference signal, and is a constant value set in firmware in this example embodiment. At operation 222, Delta_Vref 233 is subtracted from Vref0 234 to produce output voltage reference Vref 235. (Vref=Vref0−Delta_Vref).

Voltage error signal module 204 compares Vref 235 to Vout 202 and produced voltage error signal 236. In an example embodiment, voltage error signal module 204 includes an analog-to-digital converter to convert voltage Vout 202 to a digital signal. Voltage error signal 236 is an input to proportional-integral-derivative (PID) voltage regulator module 206 which generates control signal 237 for control of pulse-width-modulation (PWM) digital control module 208. PWM digital control module 208 generates control signal 224 which is used to control the at least one power switch 104 within hard-switching full-bridge power circuit 102.

Figure 3:
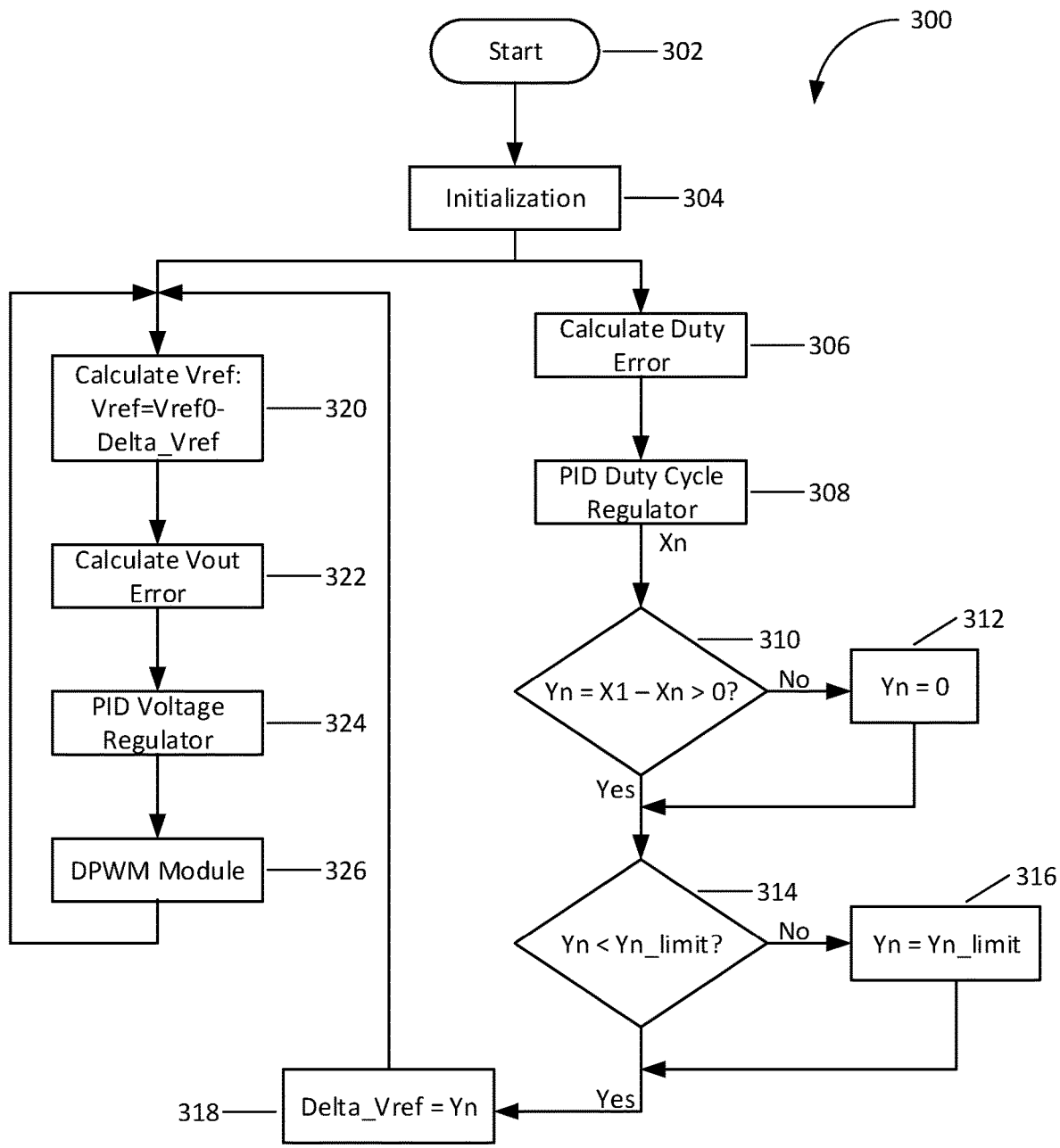
FIG. 3 illustrates an exemplary firmware flowchart for the digital control circuit of FIG. 2.

FIG. 3 illustrates an exemplary firmware flowchart 300 for the digital control circuit 200 of FIG. 2. In this example method 300 for an example implementation of the digital control circuit 200 of FIG. 2, processing begins at the start operation 302. Initialization operations are performed at operation 304 producing constants Vref0 234 and Duty ref 230 from FIG. 2, and also receiving the Duty Cycle signal 231 which are used as inputs to operations 306 and 320.

A duty cycle error is calculated at operation 306 and its value is passed to the PID duty cycle regulator module 308 to produce signal Xn 232. Variable Yn is set to X1-Xn 232, where X1 is a constant value set in firmware and less than the maximum value of Xn. Decision operation 310 determines if Yn is greater than zero. If Yn is less than or equal to zero, Yn is set to zero by operation 312. Decision operation 314 determines if Yn is less than a constant Yn_limit. If Yn is greater than or equal to Yn_limit, Yn is set to Yn_limit in operation 316. In operation 318, Delta_Vref 233 is set to Yn, and Vref 235 is calculated in operation 320 as the difference between Vref0 234 and Delta_Vref 233.

Vref 235 is provided to operation 322 where a Vout error is calculated, which is then provided to the proportional-integral-derivative (PID) voltage regulator operation 324 which generates control signal 237 for control of digital pulse-width-modulation (DPWM) control operation 326, which then provides a control signal to the at least one power switch 104 within hard-switching full-bridge power circuit 102.

Figure 4:
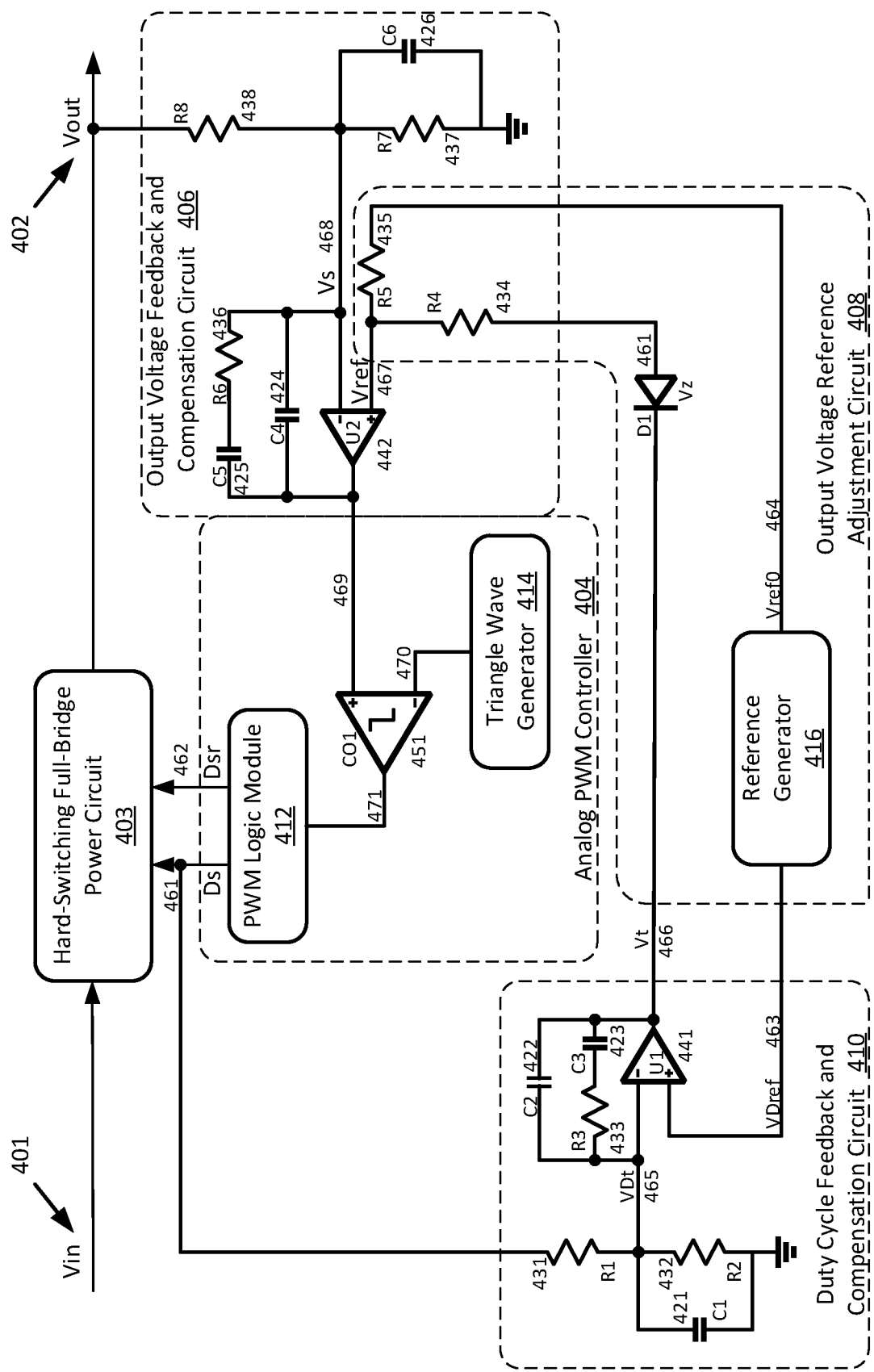
FIG. 4 illustrates an exemplary switched mode power supply comprising a power circuit and an analog control circuit.

FIG. 4 illustrates an exemplary switched mode power supply 100 comprising a power circuit 403 and an analog control circuit. In this example embodiment, the analog control circuit for hard-switching full-bridge power circuit 403 comprises analog pulse-width-modulation (PWM) controller 404, output voltage feedback and compensation circuit 406, output voltage reference adjustment circuit 408, and duty cycle feedback and compensation circuit 410.

As described above, with respect to FIG. 1, this analog control circuit is configured to provide control signals Ds 461 and Dsr 462 to power circuit 403 in order to regulate output voltage Vout at the output 402 of power circuit 403, regardless of any changes in input voltage Vin at the input 401 of power circuit 403.

In this example embodiment, signal Ds is a square wave having a duty cycle which controls power circuit 403 to produce output voltage Vout 402. In an example power circuit 403 having a buck topology Vout=Ds*Vin. Signal Dsr is a square wave having a duty cycle for provision to a synchronous rectifier within power circuit 403. In an example power circuit 403 having a buck topology Dsr=1−Ds. In power circuits 403 having a full-bridge topology both Dsr=Ds and Dsr=1−Ds are acceptable.

In this example embodiment, reference generator 416 provides stable reference voltages Vref0 464 which is the maximum reference voltage, and VDref 463 which is the maximum duty cycle reference voltage. Duty cycle feedback and compensation circuit 410 produces VDt 465 which is a stable voltage related to the duty cycle of signal Ds 461. VDt 465 is produced by an RC circuit comprising capacitor C1 421, resistor R1 431, and resistor R2 432.

Duty cycle feedback and compensation circuit 410 then produces voltage Vt 466 which is related to a difference between the current duty cycle represented by signal VDt 465 and the maximum duty cycle represented by signal VDref 463. Vt 466 is generated by differential amplifier U1 441, which is controlled by an RC circuit comprising resistor R3 433, and capacitors C2 422 and C3 423.

Figure 5:
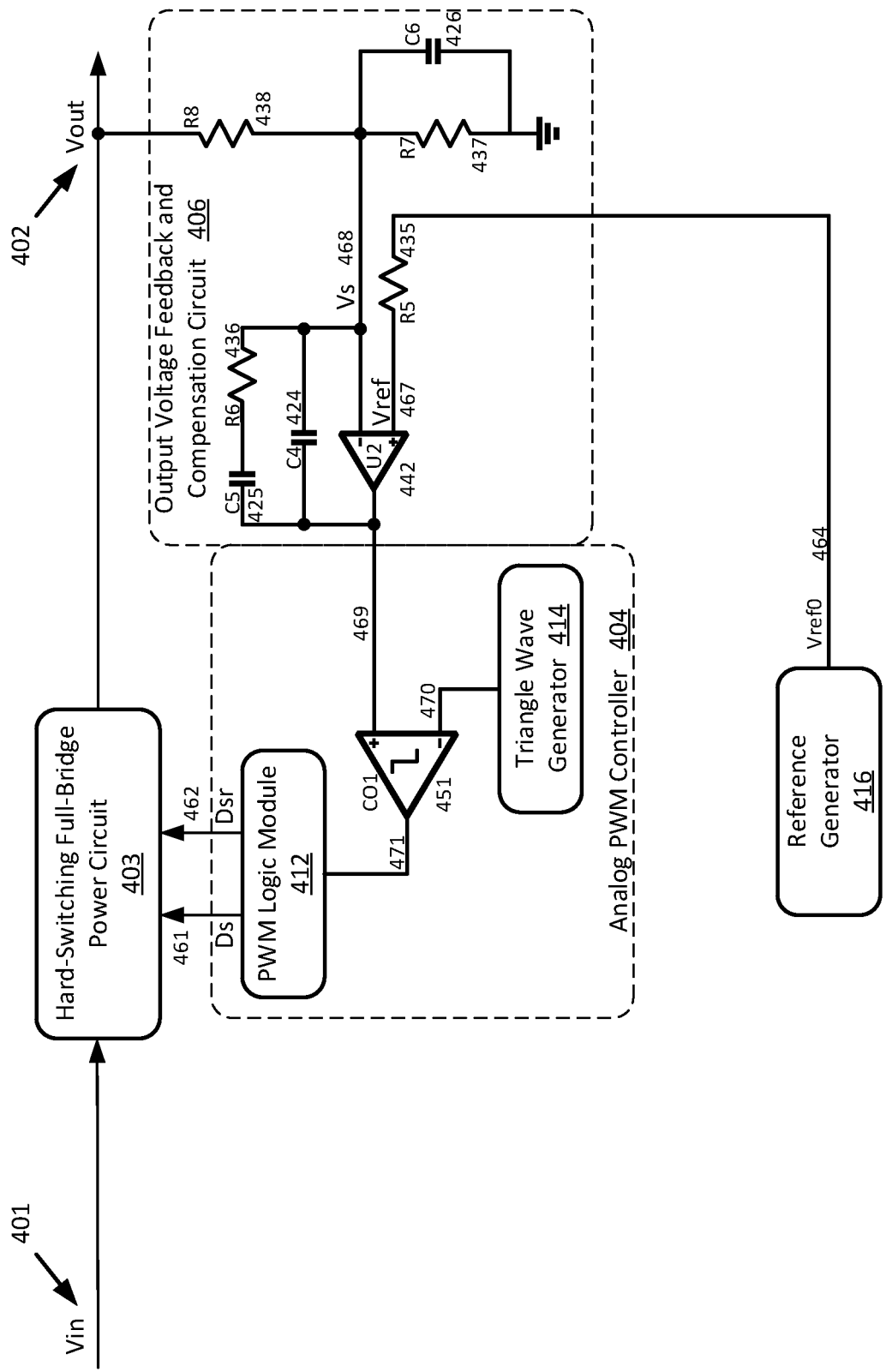
FIG. 5 illustrates the exemplary switched mode power supply comprising a power circuit and an analog control circuit from FIG. 4 for the situation where the input voltage is within a high voltage range.

Output voltage reference adjustment circuit 408 produces output voltage reference Vref 467. Vz is the voltage drop across diode D1 641. Diode D1 461 acts as a switch, such that when voltage Vt 466 is greater than Vref0 464, diode D1 461 is in a cut-off state and Vref 467 is equal to Vref0 464. This situation occurs when Vin 401 is within a high voltage range, and thus the duty cycle of signal Ds 461 is small, and therefore voltage VDt 465 is less than voltage VDref 463 placing differential amplifier U1 441 into a positive saturation state. This situation is illustrated in FIG. 5 and further described below.

When Vin 401 is within a lower voltage range, if Vref 467 still is equal to Vref0 464, the system may enter an undesired open loop state. To prevent this, output voltage reference adjustment circuit 408 becomes active. When the input voltage Vin 401 decreases, the duty cycle represented by Ds 461 increases, and voltage VDt 465 also increases, bringing differential amplifier U1 441 out of positive saturation. This causes voltage Vt 466 to decrease, and once Vt 466 drops to a low enough voltage diode D1 461 will turn on.

The system enters a balanced state when VDt 465 is equal to VDref 463, and Vs 468 (a function of Vout 402) is equal to Vref 467. Vref 467 is variable when diode D1 461 is on and it stabilizes at a value determined by the following equation:

$$Vref = Vref0 * \frac{R4}{R4+R5} + (Vz+Vt)*R5/(R4+R5) \qquad (1)$$

The output voltage Vout 402 is then determined by the following equation:

$$Vout = \frac{Vin * Dref}{n} - Iout * k \qquad (2)$$

In Equation 2, n is the turns ratio of a transformer within power circuit 403, Dref is the duty cycle when Vdt=VDref, Tout is the output current, and k is a coefficient equal to system impedance. Vref 467 can also be estimated based upon the input voltage Vin 401 and VDref 463 as determined by the following equation:

$$Vref = \left(\frac{Vin * Dref}{n} - Iout * k\right) * R7/(R7 + R8) \qquad (3)$$

Since there may be some error in the value of the system impedance coefficient k, the calculation of Vref by Equation 3 may have some error, but it still may be valuable for guiding the design of various circuit parameters.

In this example, Vs 468 is generated from output voltage Vout 402 by an RC circuit comprising capacitor C6 426 and resistors R7 437 and R8 438. Control voltage 469 is produced by differential amplifier U2 442 within output voltage feedback and compensation circuit 406. The operation of differential amplifier U2 442 is controlled by an RC circuit comprising resistor R6 436 and capacitors C4 424 and C5 425.

Control voltage 469 is combined with triangle wave 470 produced by triangle wave generator 414 in comparator CO1 451 to produce control signal 471 which is used to direct PWM logic module 412 in the production of square wave duty cycle signals Ds 461 and Dsr 462.

FIG. 5 illustrates the exemplary switched mode power supply comprising a power circuit 403 and an analog control circuit from FIG. 4 for the situation where the input voltage Vin 501 is within a high voltage range.

As discussed above with respect to FIG. 4, when Vin 401 is within a high voltage range, the duty cycle of signal Ds 461 is small, and voltage VDt 465 is less than voltage VDref 463 differential amplifier U1 441 is in a positive saturation state. The output voltage of U1 441, Vt 466 is thus greater than Vref0 464, placing diode D1 461 in a cutoff state. In this situation, Vt 466 is irrelevant and Vref 467 is equal to Vref0 464. FIG. 5 illustrates this equivalent circuit.

In this situation, the duty cycles of signals Ds 461 and Dsr 462 are entirely based on a difference between the output voltage Vout 402 and reference voltage Vref 467 (which is equal to Vref0 464), and power circuit 406 is in a stable state with a low duty cycle.

Figure 6A:
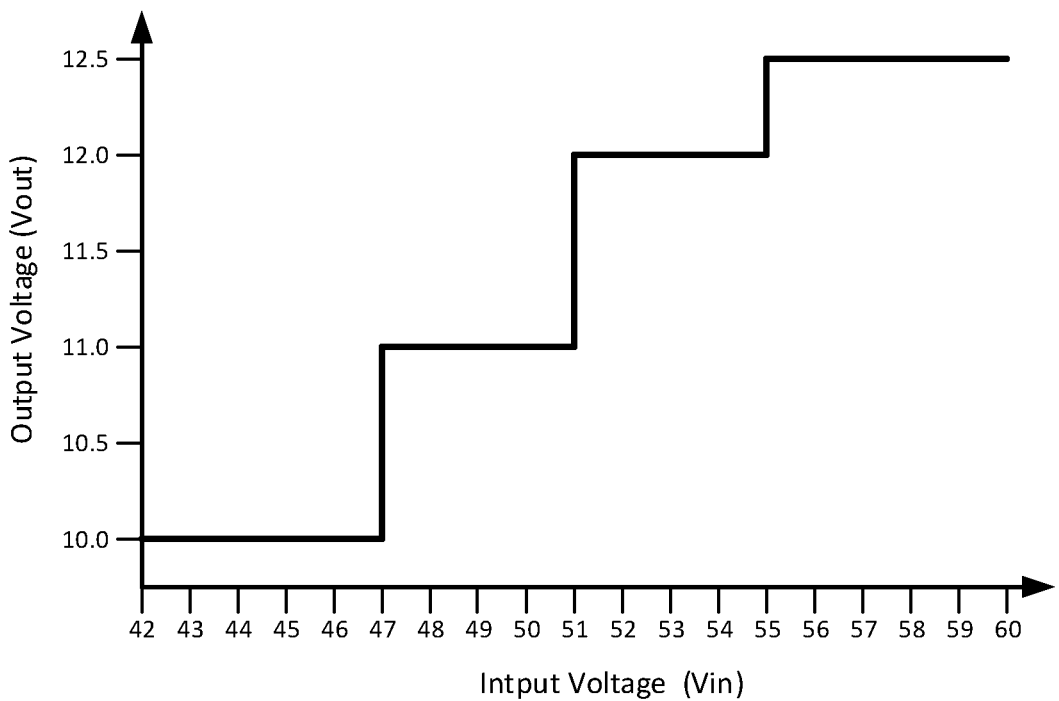
FIG. 6A illustrates an exemplary prior art relationship between the input voltage and the output voltage of a switched mode power supply comprising a power circuit and a prior art control circuit.

FIG. 6A illustrates an exemplary prior art relationship between the input voltage and the output voltage of a switched mode power supply comprising a power circuit and a prior art control circuit.

In some prior art designs, the output voltage of the power supply followed a staircase pattern. As the input voltage rises, the output voltage also rises but in quantized steps determined by the related control circuitry. This approach has several disadvantages. The output voltage has sudden changes at each switching point. These switching points are different in different power supply modules, due to errors in sensing the output and calculating control signals. This difference in switching points makes these power supplies unusable in direct-parallel applications.

Efforts to smooth out this staircase effect by providing a large number of smaller steps is difficult since it requires a much more complicated digital control circuit, and is very difficult to implement as an analog control circuit.

Figure 6B:
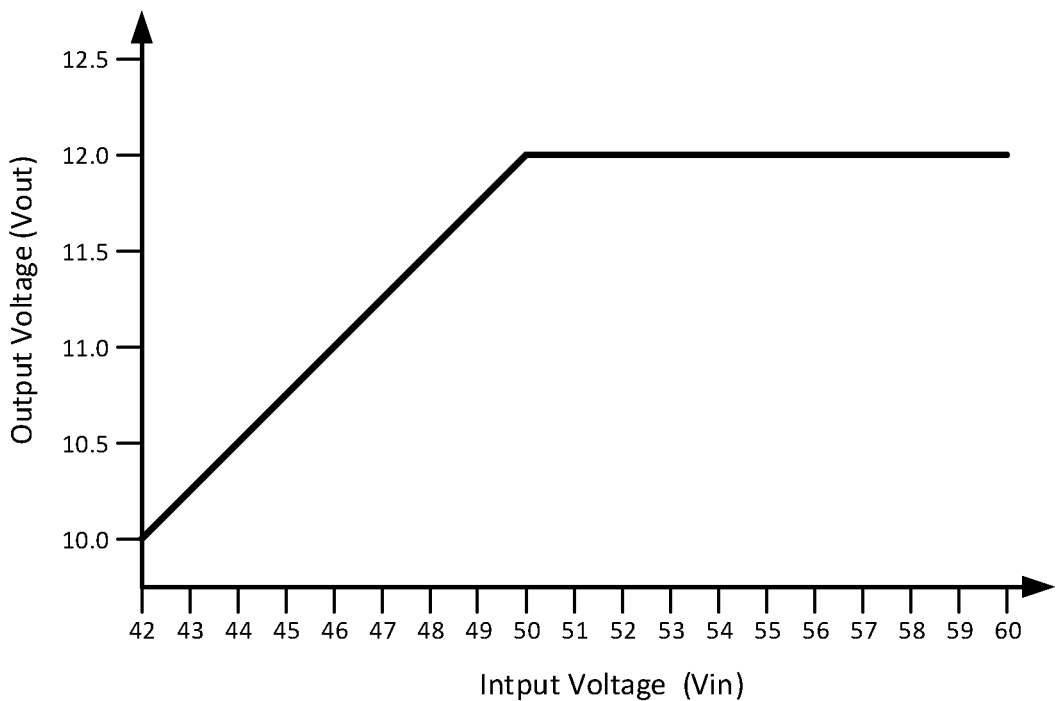
FIG. 6B illustrates an exemplary relationship between the input voltage and the output voltage of a switched mode power supply comprising a power circuit and a control circuit.

FIG. 6B illustrates an exemplary relationship between the input voltage and the output voltage of a switched mode power supply comprising a power circuit and a control circuit. In this example embodiment of the present invention, the control circuits illustrated in FIGS. 2 and 4 produce a smooth ramp of output voltage as input voltage increases, eliminating the stair steps illustrated in FIG. 6A.

Figure 7:
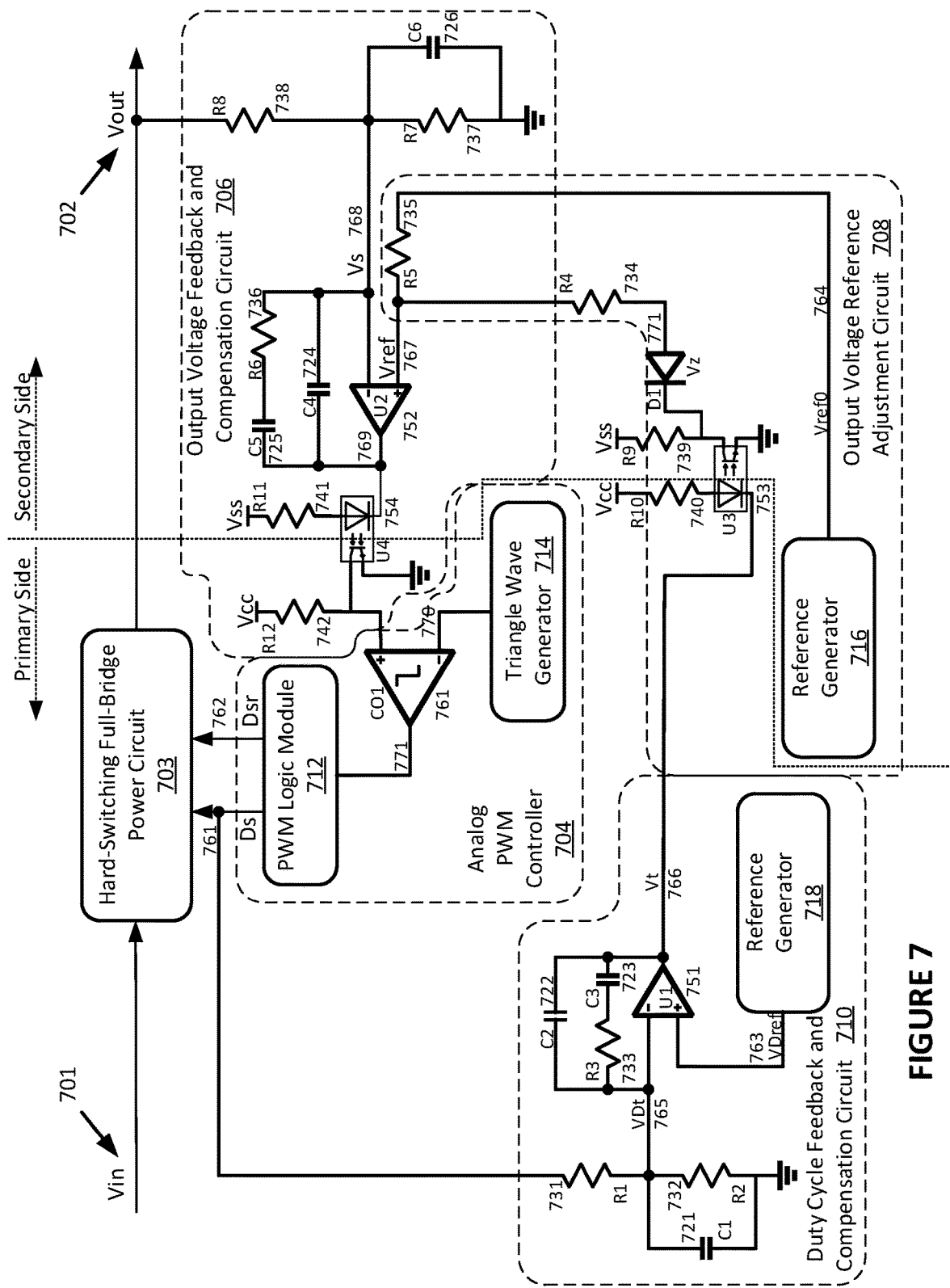
FIG. 7 illustrates an exemplary switched mode power supply comprising a power circuit and an analog control circuit including a primary side and a secondary side coupled with optical couplers.

FIG. 7 illustrates an exemplary switched mode power supply comprising a power circuit 703 and an analog control circuit including a primary side and a secondary side coupled with optical couplers. This example embodiment includes a power circuit 703 and analog control circuit identical to that of FIG. 4, however the controller is split between the primary and secondary sides of the power system.

As discussed above with respect to FIG. 4, the analog control circuit for hard-switching full-bridge power circuit 703 comprises analog pulse-width-modulation (PWM) controller 704, output voltage feedback and compensation circuit 706, output voltage reference adjustment circuit 708, and duty cycle feedback and compensation circuit 710.

As described above, with respect to FIGS. 1 and 4, this analog control circuit is configured to provide control signals Ds 761 and Dsr 762 to power circuit 703 in order to regulate output voltage Vout at the output 702 of power circuit 703, regardless of any changes in input voltage Vin at the input 701 of power circuit 703.

In this example embodiment, signal Ds is a square wave having a duty cycle which controls power circuit 703 to produce output voltage Vout 702. In an example power circuit 703 having a buck topology Vout=Ds*Vin. Signal Dsr is a square wave having a duty cycle for provision to a synchronous rectifier within power circuit 703. In an example power circuit 403 having a buck topology Dsr=1−Ds. In power circuits 703 having a full-bridge topology both Dsr=Ds and Dsr=1−Ds are acceptable.

In this example embodiment, reference generator 716 provides stable reference voltages Vref0 764 which is the maximum reference voltage, and VDref 763 which is the maximum duty cycle reference voltage. Duty cycle feedback and compensation circuit 710 produces VDt 765 which is a stable voltage related to the duty cycle of signal Ds 761. VDt 765 is produced by an RC circuit comprising capacitor C1 721, resistor R1 731, and resistor R2 732.

Duty cycle feedback and compensation circuit 710 then produces voltage Vt 766 which is related to a difference between the current duty cycle represented by signal VDt 765 and the maximum duty cycle represented by signal VDref 763. Vt 766 is generated by differential amplifier U1 741, which is controlled by an RC circuit comprising resistor R3 733, and capacitors C2 722 and C3 723.

Output voltage reference adjustment circuit 708 produces output voltage reference Vref 767. Vz is the voltage drop across diode D1 741. Diode D1 761 acts as a switch, such that when voltage Vt 766 is greater than Vref0 764, diode D1 761 is in a cut-off state and Vref 767 is equal to Vref0 764. This situation occurs when Vin 701 is within a high voltage range, and thus the duty cycle of signal Ds 761 is small, and therefore voltage VDt 765 is less than voltage VDref 763 placing differential amplifier U1 741 into a positive saturation state. This situation is illustrated in FIG. 5 and further described above.

When Vin 701 is within a lower voltage range, if Vref 767 still is equal to Vref0 764, the system may enter an undesired open loop state. To prevent this, output voltage reference adjustment circuit 708 becomes active. When the input voltage Vin 701 decreases, the duty cycle represented by Ds 761 increases, and voltage VDt 765 also increases, bringing differential amplifier U1 741 out of positive saturation. This causes voltage Vt 766 to decrease, and once Vt 766 drops to a low enough voltage diode D1 761 will turn on.

The system enters a balanced state when VDt 765 is equal to VDref 763, and Vs 768 (a function of Vout 702) is equal to Vref 767. Vref 767 is variable when diode D1 761 is on and it stabilizes at a value determined by Equation 1.

The output voltage Vout 702 is then determined by Equation 2.

In Equation 2, n is the turns ratio of a transformer within power circuit 703, Dref is the duty cycle when Vdt=VDref, Iout is the output current, and k is a coefficient equal to system impedance. Vref 767 can also be estimated based upon the input voltage Vin 701 and VDref 763 as determined by Equation 3.

Since there may be some error in the value of the system impedance coefficient k, the calculation of Vref by Equation 3 may have some error, but it still may be valuable for guiding the design of various circuit parameters.

In this example, Vs 768 is generated from output voltage Vout 702 by an RC circuit comprising capacitor C6 726 and resistors R7 737 and R8 738. Control voltage 769 is produced by differential amplifier U2 742 within output voltage feedback and compensation circuit 406. The operation of differential amplifier U2 742 is controlled by an RC circuit comprising resistor R6 736 and capacitors C4 724 and C5 725.

Control voltage 769 is combined with triangle wave 770 produced by triangle wave generator 714 in comparator COI 751 to produce control signal 771 which is used to direct PWM logic module 712 in the production of square wave duty cycle signals Ds 761 and Dsr 762.

Thus, this analog control circuit operates identically to the analog control circuit illustrated in FIG. 4 and described above even though the control circuit is divided between the primary and secondary sides of the power system.

This is accomplished by the addition of two optical couplers U3 753 and U4 754. Optical coupler U3 753 couples Vt 766 between the primary side and the secondary side and is powered by Vcc through resistor R10 740 on the primary side and by Vss through resistor R9 739 on the secondary side. Optical coupler U4 754 couples control voltage 769 between the primary side and the secondary side and is powered by Vcc through resistor R12 742 on the primary side and by Vss through resistor R11 741 on the secondary side.

Figure 8:
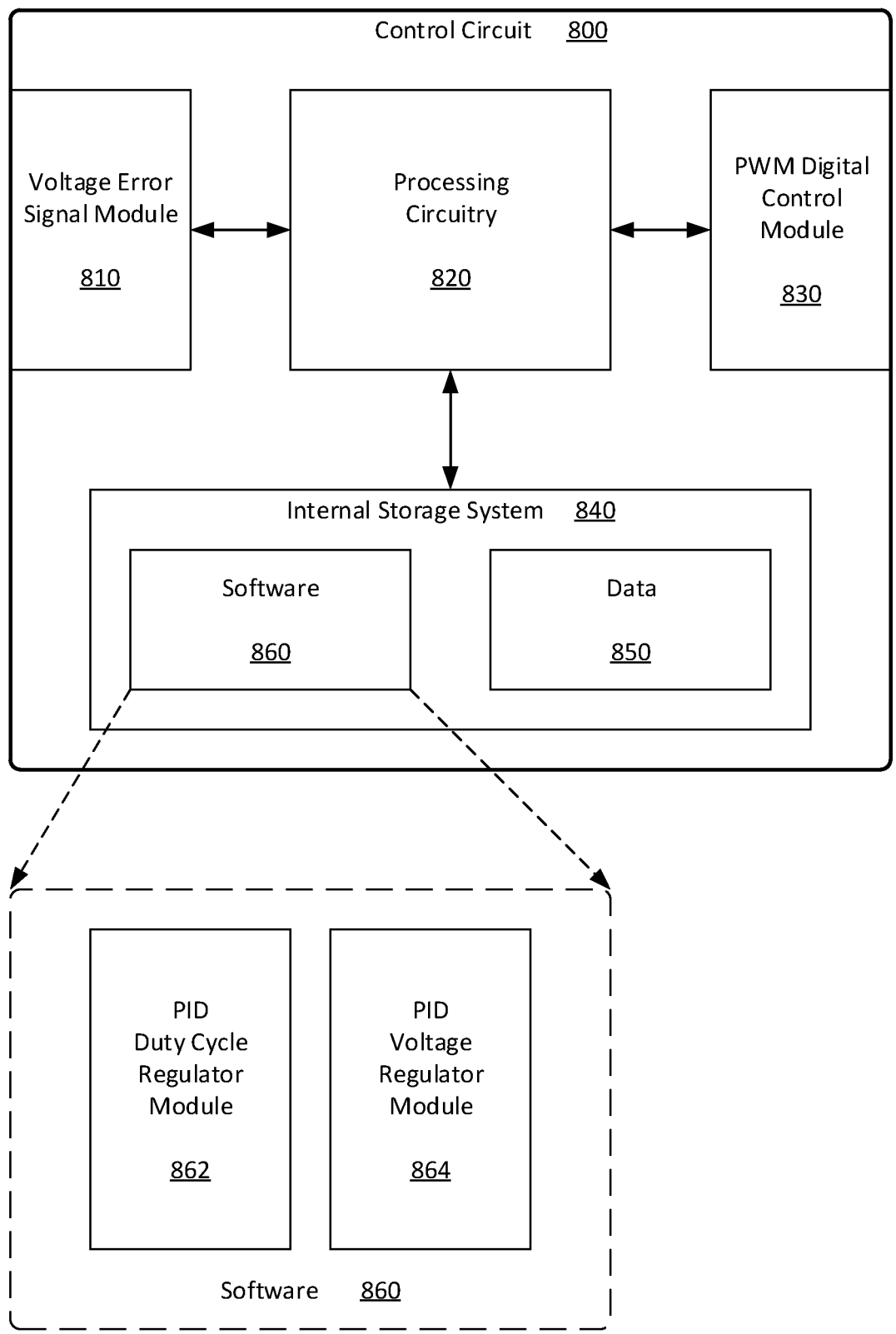
FIG. 8 illustrates an exemplary implementation of a digital control circuit for a switched mode power supply.

FIG. 8 illustrates an exemplary implementation of a digital control circuit 800 for a switched mode power supply 100, such as control circuit 200 from FIG. 2.

As discussed above, control circuit 800 may take on any of a wide variety of configurations. Here, an example configuration is provided for a control circuit implemented as a microcontroller. In some examples, control circuit 800 may be built into switched mode power supply 100 as an ASIC.

In this example embodiment, control circuit 800 comprises voltage error signal module 810, processing circuitry 820, pulse-width-modulation (PWM) digital control module 830, and internal storage system 840. Voltage error signal module 810 comprises circuitry and software configured to receive an output voltage from switched mode power supply 100, convert the output voltage to a digital output value, and produce a signal for processing by proportional-integral-derivative (PID) voltage regulator module 864. Voltage error signal module 810 may comprise any combination of hardware and software operations.

Pulse-width-modulation (PWM) digital control module 830 comprises circuitry configured to generate a control signal for the at least one power switch of switched mode power supply 100 based at least in part on a control value received from proportional-integral-derivative (PID) voltage regulator module 864. In an example embodiment, the control signal is a square wave having a duty cycle, which is used to control at least one power switch within switched mode power supply 100. Pulse-width-modulation (PWM) control module 830 may comprise any combination of hardware and software operations.

Processing circuitry 820 comprises electronic circuitry configured to perform the tasks of a digital control circuit 800 for switched mode power supply 100 as described above. Processing circuitry 820 may comprise microprocessors and other circuitry that retrieves and executes software 860. Processing circuitry 820 may be embedded in a power supply in some embodiments. Examples of processing circuitry 820 include general purpose central processing units, application specific processors, and logic devices, as well as any other type of processing device, combinations, or variations thereof. Processing circuitry 820 can be implemented within a single processing device but can also be distributed across multiple processing devices or sub-systems that cooperate in executing program instructions.

Internal storage system 840 can comprise any non-transitory computer readable storage media capable of storing software 860 that is executable by processing circuitry 820. Internal storage system 820 can also include various data structures 850 which comprise one or more databases, tables, lists, or other data structures. Storage system 840 can include volatile and nonvolatile, removable and non-removable media implemented in any method or technology for storage of information, such as computer readable instructions, data structures, program modules, or other data.

Storage system 840 can be implemented as a single storage device but can also be implemented across multiple storage devices or sub-systems co-located or distributed relative to each other. Storage system 840 can comprise additional elements, such as a controller, capable of communicating with processing circuitry 820. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 860 can be implemented in program instructions and among other functions can, when executed by control circuit 800 in general or processing circuitry 820 in particular, direct control circuit 800, or processing circuitry 820, to operate as described herein for a digital control circuit 800 for a switched mode power supply 100. Software 860 can include additional processes, programs, or components, such as operating system software, database software, or application software. Software 860 can also comprise firmware or some other form of machine-readable processing instructions executable by elements of processing circuitry 820.

In at least one implementation, the program instructions can include PID duty cycle regulator module 862 and PID voltage regulator module 864. PID duty cycle regulator module 862 includes instructions directing processing circuitry 820 to receive a duty error signal (based on a duty cycle of switched mode power supply 100 and a maximum duty cycle reference signal) and to output control signal Yn as described above and illustrated in FIG. 2. Various portions of PID duty cycle regulator module 862 may be implemented in hardware, firmware, or software.

PID voltage regulator module 864 includes instructions directing processing circuitry 820 to generate a control value for input to PWM digital control module 830 based at least in part on a voltage error signal generated from the output voltage of switched mode power supply 100 and a reference voltage as discussed above and illustrated in FIG. 2. Various portions of PID voltage regulator module 864 may be implemented in hardware, firmware, or software.

In general, software 860 can, when loaded into processing circuitry 820 and executed, transform processing circuitry 820 overall from a general-purpose computing system into a special-purpose computing system customized to operate as described herein for a digital control circuit 800 for a switched mode power supply 100, among other operations. Encoding software 860 on internal storage system 840 can transform the physical structure of internal storage system 840. The specific transformation of the physical structure can depend on various factors in different implementations of this description. Examples of such factors can include, but are not limited to, the technology used to implement the storage media of internal storage system 840 and whether the computer-storage media are characterized as primary or secondary storage.

For example, if the computer-storage media are implemented as semiconductor-based memory, software 860 can transform the physical state of the semiconductor memory when the program is encoded therein. For example, software 860 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

What is claimed is:

1. A method of regulating an output voltage of a switched mode power supply having a variable input voltage and at least one power switch, the method comprising:
   generating a control signal for the at least one power switch of the switched mode power supply based at least in part on a control voltage, the control signal having a duty cycle;
   generating an output signal based at least in part on a comparison of the duty cycle of the control signal with a maximum duty cycle;
   comparing the output signal with a comparison value;
   generating a delta reference voltage signal based on the comparison of the output signal with the comparison value;
   generating a reference voltage based on a comparison of the delta reference voltage signal with a maximum output voltage reference signal; and
   generating the control voltage based at least in part on the reference voltage and the output voltage of the switched mode power supply;
   wherein generating the delta reference voltage signal comprises setting the delta reference voltage signal equal to a difference between the output signal and the comparison value based on the difference being greater than zero; and
   wherein generating the delta reference voltage signal comprises setting the delta reference voltage signal equal to zero based on the difference between the output signal and the comparison value being less than zero.

2. The method of claim 1, wherein the control voltage is generated by an output voltage feedback and compensation circuit.

3. The method of claim 1, wherein the control voltage is based at least in part on a difference between the reference voltage and the output voltage.

4. The method of claim 3, wherein the control voltage is generated by a differential amplifier.

5. The method of claim 1, wherein the control signal is a square wave.

6. A control circuit for regulating an output voltage of a switched mode power supply having a variable input voltage and at least one power switch, the control circuit configured to:
   generate a control signal for the at least one power switch of the switched mode power supply based at least in part on a control value, the control signal having a duty cycle;
   generate an output signal value based at least in part on a comparison of the duty cycle of the control signal with a maximum duty cycle;
   compare the output signal value with a comparison value;
   generate a delta reference voltage signal based on the comparison of the output signal value with the comparison value;
   generate a reference voltage based on a comparison of the delta reference voltage signal with a maximum output voltage reference signal; and
   generate the control value based at least in part on a difference between the reference voltage and the output voltage of the switched mode power supply;
   wherein the control circuit, in being configured to generate the delta reference voltage signal, is configured to set the delta reference voltage signal equal to a difference between the output signal value and the comparison value based on the difference being greater than zero; and
   wherein the control circuit is further configured to set the delta reference voltage signal equal to zero based on the difference between the output signal value and the comparison value being less than zero.

7. The control circuit of claim 6, wherein the control circuit comprises a digital control circuit.

8. The control circuit of claim 7, wherein the control signal is generated by a pulse-width-modulation (PWM) digital controller.

9. The control circuit of claim 7, wherein the control circuit comprises a microcontroller.

10. The control circuit of claim 7, wherein the control circuit comprises a proportional-integral-derivative (PID) duty regulator module, and a PID voltage regulator module.

11. A switched mode power supply comprising a power circuit and a control circuit, wherein the control circuit is configured to:
generate a control signal for at least one power switch of the switched mode power supply based at least in part on a control voltage, the control signal having a duty cycle;
generate an output signal based at least in part on the duty cycle of the control signal and a maximum duty cycle;
compare the output signal with a comparison value;
generate a delta reference voltage signal based on the comparison of the output signal with the comparison value;
generate a reference voltage based on a comparison of the delta reference voltage signal with a maximum output voltage reference signal; and
generate the control voltage based at least in part on a difference between the reference voltage and an output voltage of the switched mode power supply;
wherein the control circuit, in being configured to generate the delta reference voltage signal, is configured to set the delta reference voltage signal equal to a difference between the output signal and the comparison value based on the difference being greater than zero; and
wherein the control circuit is further configured to set the delta reference voltage signal equal to zero based on the difference between the output signal and the comparison value being less than zero.

12. The switched mode power supply of claim 11, wherein the power circuit comprises an isolation transformer.

13. The switched mode power supply of claim 11, wherein the control circuit comprises a primary side and a secondary side, and the primary side is coupled with the secondary side by two or more optical couplers.

14. The switched mode power supply of claim 11, wherein the power circuit comprises two or more power circuits.

* * * * *